No. 775,833. PATENTED NOV. 22, 1904.
A. LEVISON.
MANIFOLD BOOK.
APPLICATION FILED APR. 9, 1903.
NO MODEL. 4 SHEETS—SHEET 1.
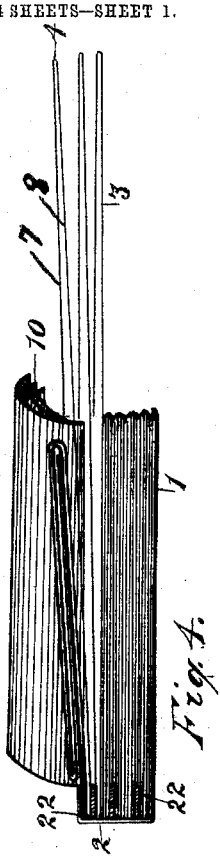
WITNESSES:
INVENTOR.
Alexander Levison
BY
Francis M. Wright
ATTORNEY.

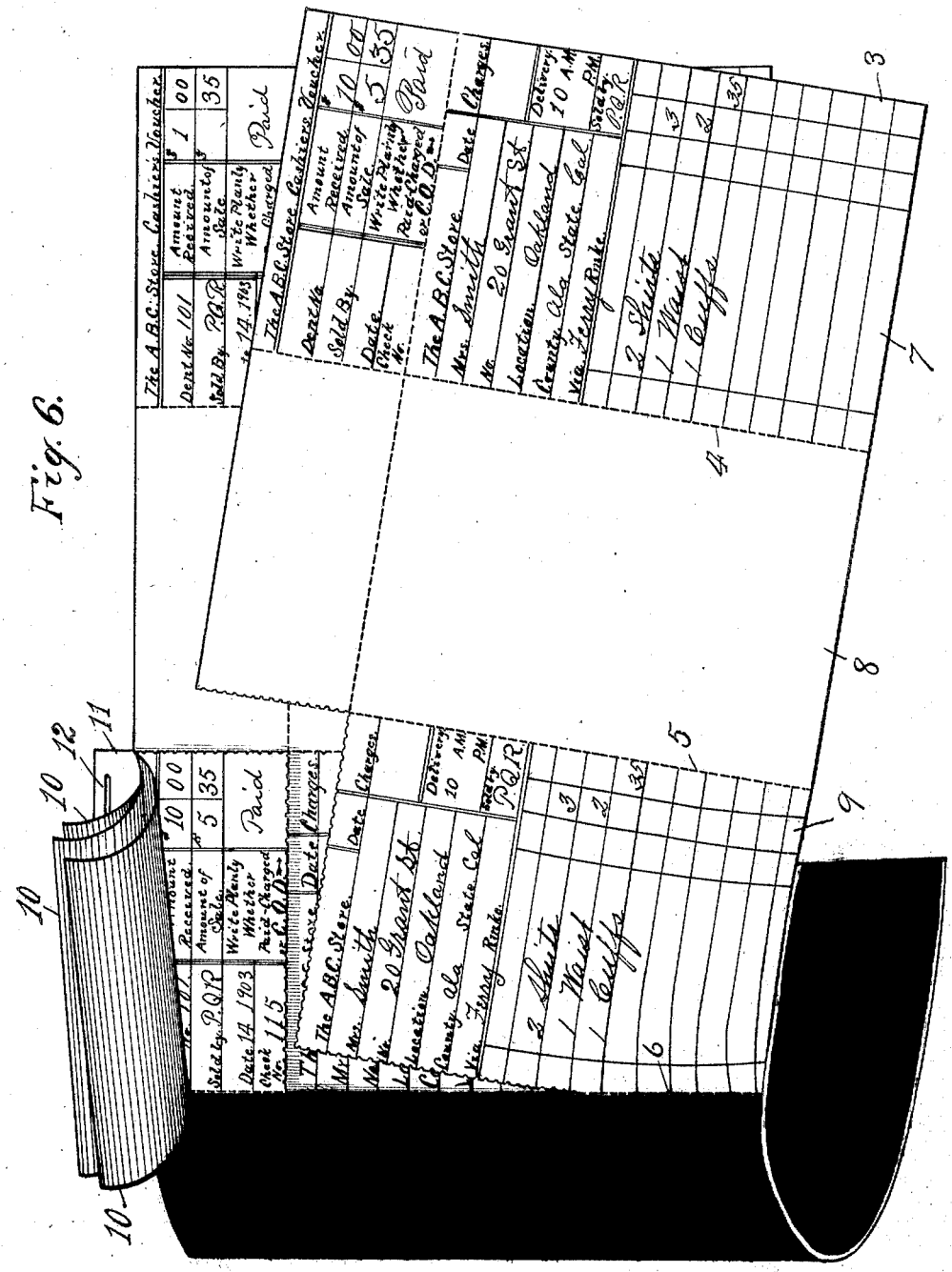

No. 775,833. PATENTED NOV. 22, 1904.
A. LEVISON.
MANIFOLD BOOK.
APPLICATION FILED APR. 9, 1903.
NO MODEL. 4 SHEETS—SHEET 3.
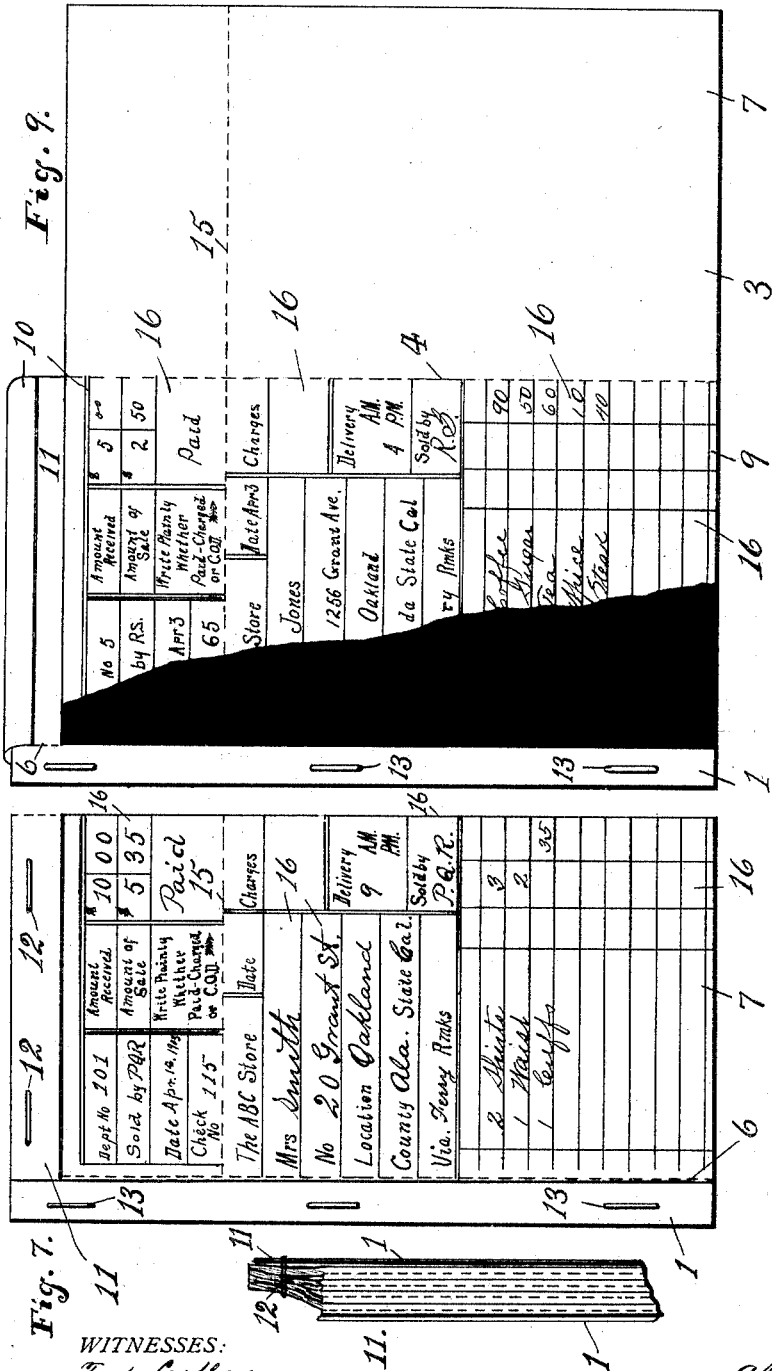
WITNESSES:
Tycho Castberg.
K Lockwood-Nevins.
INVENTOR.
Alexander Levison
BY Francis W. Wright
ATTORNEY.

No. 775,833. PATENTED NOV. 22, 1904.
A. LEVISON.
MANIFOLD BOOK.
APPLICATION FILED APR. 9, 1903.
NO MODEL. 4 SHEETS—SHEET 4.
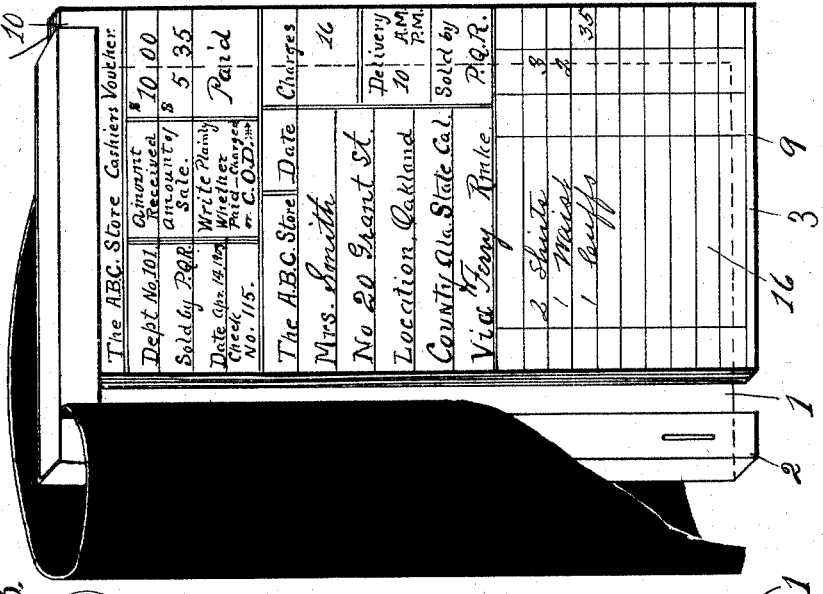
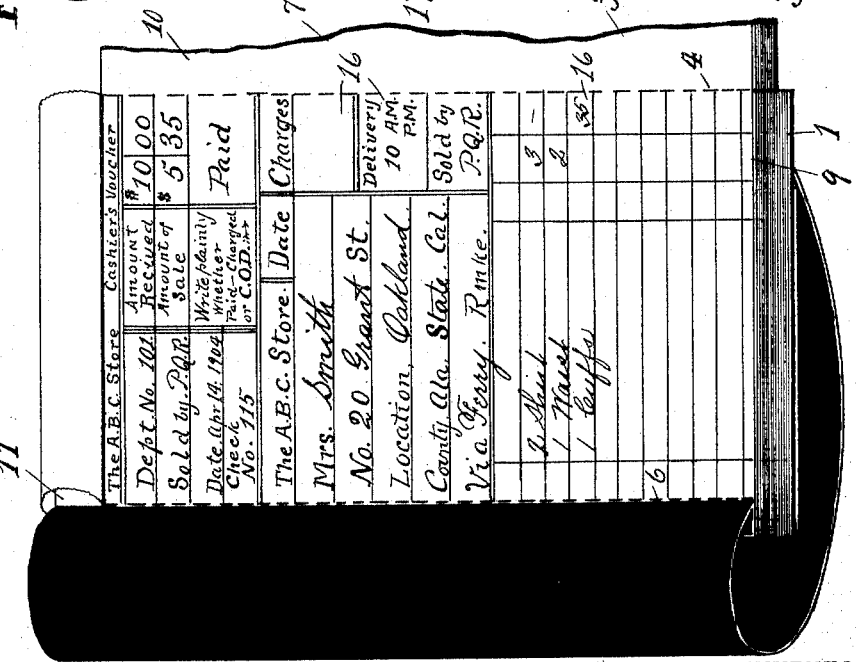
WITNESSES:
Bessie Gorfinkel.
K. Lockwood Nevins
INVENTOR.
Alexander Levison
BY
Francis M. Wright
ATTORNEY.

No. 775,833. Patented November 22, 1904.

UNITED STATES PATENT OFFICE.

ALEXANDER LEVISON, OF SAN FRANCISCO, CALIFORNIA.

MANIFOLD-BOOK.

SPECIFICATION forming part of Letters Patent No. 775,833, dated November 22, 1904.

Application filed April 9, 1903. Serial No. 151,726. (No model.)

*To all whom it may concern:*

Be it known that I, ALEXANDER LEVISON, a citizen of the United States, residing at San Francisco, in the county of San Francisco and State of California, have invented certain new and useful Improvements in Manifold-Books, of which the following is a specification.

My invention relates to improvements in manifold-books, the object of my invention being to provide a manifold-book which shall produce a triplicate copy and shall be especially adapted for recording sales in department or other large stores, where a strict auditing has to be made of essential particulars relating to sales and the delivery of goods.

The object of my invention is to provide a manifold-book which will enable this to be done in a rapid, accurate, effective, and convenient manner.

My invention, therefore, resides in the novel construction, combination, and arrangement of parts for the above ends, hereinafter fully specified, and particularly pointed out in the claims.

In the accompanying drawings, Figure 1 is a front elevation of my improved manifold-book, showing the same closed. Fig. 2 is an end view of the same. Fig. 3 is a view similar to Fig. 1, but showing the book open in the position for use. Fig. 4 is a view similar to Fig. 2 of the book in the position shown in Fig. 1. Fig. 5 is a vertical section of the upper portion of the book. Fig. 6 is a perspective view of the book, showing the triplicate sheet partly detached therefrom. Figs. 7 to 11 are views similar to Figs. 1 to 5 of a modification. Fig. 12 is a perspective view; and Fig. 13 is a side view of a second modification. Fig. 14 is a similar view of a third modification.

Referring to the drawings, 1 represents a backing of cardboard or thick paper, the side of which is turned over, as shown at 2, to form a binding for the edges of the sheets 3 of the book. Each sheet 3 is divided by three vertical weakened lines 4, 5, and 6 into three sections 7, 8, and 9 and a stub, which weakened lines are preferably made by perforations. These sections are substantially the same width, but the height of the inner section 9 is somewhat greater than the heights of the other two sections, thus forming extensions 11, which are riveted or otherwise secured to the top of the cardboard backing 1, as shown at 12. Before binding the books, however, a suitable number of sheets 3 are taken to form a single group, herein shown as containing four sheets, and each sheet has its outer section 7 folded over the outer line of perforations 4 onto the middle section. These sheets with the sections so folded are then laid in a pile on each other to form a single group, and then, the sheets being laid in such pile so that the edges are in vertical alinement, the sheets are folded simultaneously over the second line of perforations 5. This constitutes a single group of sheets. The stubs of such group all project on the left-hand side, and the extensions 11 project at the top. A suitable number of such groups are taken and placed in a pile over each other, according to the thickness of which it is desired to make the book, alternated at their edges or stubs by blocking-strips 22, and then a carbon approximately of the combined widths of the stub and the inner and middle sections is laid on top of the pile with its edge registering with the edge approximately of the pile. The pile of sections, together with the carbon 18, is then inserted in the folded-over edge of the cardboard backing, and the whole is bound together by the rivets 13. At the same time the extensions 11 are riveted or otherwise secured to the top of the cardboard backing.

In addition to the vertical perforations each sheet has a transverse weakened line, preferably formed by perforations 15, crossing the vertical perforations and dividing the sheet proper, including the stub, into the six portions. The transverse line of perforations will generally be formed nearer to the top than to the bottom, so that the upper portions 10 are smaller than the lower portions. Suitable directions to the salesmen are printed on these sections with blank spaces 16 for the inscription of the particulars of the sale. The printed matter will often be identical in all the sections, but not necessarily so, it being understood, however, that the printing will be such as to have proper relation to the inscription which will be made upon all the sections through the medium of the carbon. This printing is made upon the upper surface of the inner and outer sections and upon the under surface of the middle section.

When ready for use, the carbon will be resting upon the middle and inner sections of the top sheet of the uppermost carbon, the outer section being folded over the carbon onto the middle section, and said outer and middle sections being then folded onto the inner section and having the outer and middle sections of all the other sheets of the same group above and the inner sections of said sheets below. The salesman will also have prepared the sheets when coming to a new group by tearing down all the sheets of the same section along the line of perforations 5 as far as the transverse line of perforations 15. When the salesman wishes to record a sale, he throws out the folded outer and middle sections of all the sheets of the group except the uppermost sheet, and the parts of the book are then in the position shown in Fig. 2. The salesman now writes upon the back of the middle section of the top sheet. By means of the carbon-paper copies are made upon the other two sections of the same sheet in corresponding places thereon, so that a triplicate copy is formed. After completing his record the salesman unfolds the sheet and tears the horizontal line of perforations 15 through the inner section as far as the stub and then tears down the line of perforations along the side of the stub, thus detaching the sheet, leaving within the book the upper portion of the inner section. The sheet now contains the lower portions of all the sections and the upper portions of the middle and outer sections. The upper portion of the inner section is retained by the salesman within his book as a tally for his individual use and also for auditing by the auditor. The sheet containing the other five portions is sent to the cashier, who tears off the upper portions of the other sections, files one of them for the purpose of balancing cash and returns the other to the salesman, which is then handed to the customer as a receipt. Two of the three lower portions are sent to the delivery-department. One of them is placed with the goods in the package and the other is retained by the delivery-department and stamped with the time of delivery as a voucher. The third lower portion is sent by the cashier to the bookkeeper for completing the checking system. Instead of folding the sheets into groups they may be folded individually, according to the preference of the user.

While I have herein shown one of the various uses to which the different sections can be put, there are many other ways in which they may be used. For instance, one section may be used for addresses, the book thus taking the place of two books now used at present—namely, the address-book and the counter check-book. In stores where furniture or other goods are sold on leases one of the sections may be used as a lease-section. In clothing and other stores of like character one of the sections may be used as a repair-record section.

In the modification shown in Figs. 7 to 11 the sheet is divided vertically into only two sections, instead of three sections, and the carbon extends the width of the inner section only.

In the modification shown in Figs. 12 and 13 the transverse line of perforations is dispensed with and the inner sheet is folded back over the back of the backing and is held there by a suitable clamp, as by a rubber band 17, secured to the backing, in order to make room for the writing upon the other sheets.

In the modification shown in Fig. 14 a separate back is provided, to which the carbon is attached along its edge, and the book is inserted in a slide or guide at the top of the backing.

I claim—

1. A manifold-book comprising a plurality of sheets bound at one end each sheet having a plurality of sections separated by weakened lines, the sheets being also bound together along one edge of one of their side sections transverse to the weakened lines, and a carbon with its bound or fixed end in proximity to the bound ends of the sheets and its free end substantially overlying the outermost weakened line, substantially as described.

2. A manifold-book comprising a plurality of sheets, divided into sections by weakened lines, the sheets being bound along one edge of one of their side sections transverse to the weakened lines, and a carbon-sheet for use with said sections, substantially as described.

3. A manifold-book comprising a plurality of sheets, each sheet having at least three sections separated by weakened lines, the sheets being bound together along one edge of one of their side sections transverse to the weakened lines, and a carbon-sheet extending over at least two of the sections of a sheet, substantially as described.

4. A manifold-book comprising a plurality of sheets, each sheet having at least three sections separated by weakened lines, part only of the sections of said sheets being bound together along a line transverse to the weakened lines, and a carbon-sheet bound with the book extending over at least two of the sections of a sheet, substantially as described.

5. A manifold-book comprising a plurality of sheets, each sheet having at least three sections separated by weakened lines, part only of the sections of said sheets being bound together along a line transverse to the weakened lines, and a carbon-sheet secured to the book along a line parallel to the weakened lines and transverse to the line of binding of the sheet and extending over at least two of the sections of a sheet, substantially as described.

6. A manifold-book comprising a plurality of sheets, said sheets having sections separated by weakened lines, part only of the sections of said sheets being bound together along a line transverse to the weakened lines, and said sections being also divided into parts by weakened lines parallel to the line of binding, and a carbon-sheet extending over all but one of said sections, substantially as described.

7. A manifold-book comprising a plurality of sheets, said sheets being divided into sections by weakened lines, part only of the sections of said sheets being bound together along a line transverse to the weakened lines, and a carbon-sheet bound with the sections and extending over all but one of the sections of a sheet, substantially as described.

8. A manifold-book comprising a plurality of sheets each divided into sections and a stub by weakened lines, said sheets being bound together in a portion only of an edge transverse to the weakened lines, the remainder of the edges of the sheets being free and the stubs being also bound together parallel to the weakened lines, and a suitable carbon-sheet therefor, substantially as described.

9. A manifold-book comprising a plurality of sheets, each sheet divided into three sections by parallel weakened lines, each section being subdivided into two parts by a weakened line transverse to the first series of weakened lines, the lateral sections on one side being bound along an edge parallel with the second series of weakened lines, and a suitable carbon-sheet therefor, substantially as described.

10. A manifold-book comprising a plurality of sheets each divided into sections and a stub by weakened lines, said sections being again divided into parts by weakened lines transverse to the first series of weakened lines, corresponding parts of one section only of each sheet being bound together along an edge parallel to the second series of weakened lines, and the stubs being all bound together, and a suitable carbon-sheet therefor, substantially as described.

11. A manifold-book comprising a plurality of sheets, each sheet being divided into sections by vertical weakened lines and said sections being subdivided by transverse weakened lines, the lateral sections on one side being bound along an edge transverse to the vertical weakened lines, and a carbon-sheet bound with said book and extending over all but one of the sections of a sheet, substantially as described.

12. A manifolding-book of the nature described formed of a plurality of leaves, each leaf divided into a permanent outside or lateral section, and folding sections, by weakened lines between the sections, the lateral permanent sections of the various leaves being bound together at their upper ends, the bound sections being of greater length than the folding sections to form a binding-stub at their upper ends.

13. A manifolding-book of the nature described formed of a plurality of leaves each leaf comprising multiple sections provided with intervening perforated lines, one lateral section of each leaf projecting at its upper end beyond the adjacent section, the projecting ends of the corresponding sections being permanently bound together.

14. A manifolding-book of the nature described formed of a plurality of leaves each leaf divided into a permanent section and a plurality of folding sections by weakened lines, the permanent sections being bound together at their upper ends, and the folding sections of each leaf arranged to fold over the permanent section and made separable one from another and from the permanent section along the weakened lines.

15. A manifolding-book of the nature described formed of a plurality of leaves, each leaf divided into a permanent section and a plurality of folding sections by weakened lines, the permanent sections being bound together at their upper ends, the folding sections of each leaf arranged to fold over the permanent section, the permanent sections of the leaves projecting at their upper ends beyond the upper ends of the folding sections.

16. A manifolding-book of the nature described formed of a plurality of leaves, each leaf divided into a permanent section and a plurality of folding sections by weakened lines, the permanent sections being bound together at their upper ends, and the folding sections of each leaf arranged to fold over the permanent section, the permanent section of the leaves projecting at their upper ends beyond the upper ends of the folding sections, and a double-faced sheet of carbon secured in the book to extend over the permanent section and the adjacent folding section.

In witness whereof I have hereunto set my hand in the presence of two subscribing witnesses.

ALEXANDER LEVISON.

Witnesses:
 FRANCES M. WRIGHT,
 BESSIE GORFINKEL.